(12) United States Patent
Shyu

(10) Patent No.: US 8,045,276 B2
(45) Date of Patent: Oct. 25, 2011

(54) COMPACT ZOOM LENS WITH THREE LENS GROUPS AND DESIGN METHOD THEREOF

(75) Inventor: San-Woei Shyu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 12/010,215

(22) Filed: Jan. 22, 2008

(65) Prior Publication Data

US 2010/0277810 A1 Nov. 4, 2010

(51) Int. Cl.
*G02B 15/14* (2006.01)
(52) U.S. Cl. .................. 359/689; 359/683
(58) Field of Classification Search .......... 359/689, 359/680–682
See application file for complete search history.

(56) References Cited

U.S. PATENT DOCUMENTS

| | | | |
|---|---|---|---|
| 7,339,747 B2 * | 3/2008 | Yamamoto et al. | 359/686 |
| 2005/0286138 A1 * | 12/2005 | Matsusaka | 359/680 |
| 2009/0009884 A1 * | 1/2009 | Ohtake et al. | 359/689 |
| 2010/0033834 A1 * | 2/2010 | Matsusaka et al. | 359/682 |

* cited by examiner

*Primary Examiner* — Jordan Schwartz
(74) *Attorney, Agent, or Firm* — Muncy, Geissler, Olds & Lowe, PLLC

(57) ABSTRACT

A compact zoom lens with three lens groups and a design method thereof. Along the optical axis from the object side to the image side, the compact zoom lens with three lens groups includes a negative power first lens group having a negative power first lens and a positive power second lens, a positive power second lens group having a positive power third lens, a negative power fourth lens leaned with the third lens and a positive power fifth lens, and a third lens group having a positive power sixth lens. The zoom lens matches requirements of optical properties for aberration correction. Minimum change of the distance between the first lens of the first lens group and the image forming plane from the WIDE position to the TELE position is used as the objective function of optimization.

7 Claims, 7 Drawing Sheets

Spherical Aberration
Fno 2.71

Astigmatism
Image height 2.83

Distortion
Image height 2.83

Lateral chromatic aberration(g-line)
Image height 2.83

Spherical Aberration
Fno 4.31

Astigmatism
Image height 2.83

Distortion
Image height 2.83

Lateral chromatic aberration(g-line)
Image height 2.83

Spherical Aberration
Fno 5.50

-0.20  0.00  0.20

Astigmatism
Image height 2.83

-0.20  0.00  0.20

Distortion
Image height 2.83

-2.00  0.00  2.00

Lateral chromatic aberration(g-line)
Image height 2.83

-0.005  0.000  0.005

Spherical Aberration
Fno 2.91

Astigmatism
Image height 2.83

Distortion
Image height 2.83

Lateral chromatic aberration(g-line)
Image height 2.83

Spherical Aberration
Fno 4.63

Astigmatism
Image height 2.83

Distortion
Image height 2.83

Lateral chromatic aberration(g-line)
Image height 2.83

Spherical Aberration
Fno 5.88

Astigmatism
Image height 2.83

Distortion
Image height 2.83

Lateral chromatic aberration(g-line)
Image height 2.83

COMPACT ZOOM LENS WITH THREE LENS GROUPS AND DESIGN METHOD THEREOF

BACKGROUND OF THE INVENTION

The present invention relates to a compact zoom lens with three lens groups and a design method thereof, especially to a compact zoom lens with three lens groups having about 3× zoom ratio and minimum length change of the lens while changing from a wide angle (WIDE) position to a telephoto (TELE) position.

In recent years, compact zoom lens with 3× zoom ratio has been well developed. After the problems of aberration correction have been solved, such zoom lens has been broadly applied to various cameras, digital cameras and video equipments. Among the compact zoom lens, the zoom lens with three lens groups has received quite a lot attention due to their features of compact size, high image quality and low aberration.

Users expect the zoom lens with features of high speed focusing, compact size and light weight while suppliers focus on easy driving and operation, precision focusing and low aberration of the lens as well as lower manufacturing cost. The focusing way of the zoom lens with three lens groups is divided into inner focus type and rear focus type. Refer to the rear focus type, similar devices are revealed by Japan patents JP2003-222797, JP2003-140041, JP2003-107348, U.S. Pat. No. 7,177,100, U.S. Pat. No. 7,164,539, U.S. Pat. No. 7,133,215, U.S. Pat. No. 7,031,073, U.S. Pat. No. 7,019,911, U.S. Pat. No. 6,943,960, U.S. Pat. No. 6,982,834, Taiwan patents No. I264558 and No. I259910. As to the inner focus type, refer to JP2006-209122, JP2006-184880, JP2004-109559, U.S. Pat. No. 7,136,232, US2006/0139767, U.S. Pat. No. 7,102,830, Taiwan patents No. I240801 and No. I251714. Moreover, in Japan patents 2004-380436, JP 2003-107348, a design of high angle shooting in WIDE position is disclosed.

In order to make the lens more compact, in prior arts, the first lens group includes at least one lens. While in rear focus, the first lens group moves far away form the image side in the TELE position while it comes close to the image side in the WIDE position. That means when changes from the WIDE position to the TELE position, distance D from an object side surface of the first lens of the first lens group to the image forming plane increases. Thus the whole zoom lens stretches out the camera. While moving or casing the camera, the zoom lens is easily to get impacted or damaged. This leads to inconvenience of users or reduced precision of the lens. In order to solve such problem, an actuator is added so as to move the zoom lens back into the camera. Thus the manufacturing cost of the camera is increased due to addition of the actuator.

As to the inner focus type, while in the TELE position or WIDE position, the focal length is changed by the movement of the second lens group, the third lens group, or the image forming plane so as to achieve zooming effect. However, while designing the zoom lens, positive or negative power, curvature, and relative distance among each lens of the first lens group, the second lens group, and the third lens group require to be compromised with one another. Even the first lens group is fixed, the fact that under better optical design of the zoom lens, the D ($D_W$) in the WIDE position should be different from the D ($D_T$) in the TELE position. The difference between the WIDE position D ($D_W$) and the TELE position D ($D_T$) will have effects on aberrations, astigmatism and distortion of the zoom lens. In U.S. Pat. No. 7,019,911, in order to resolve such problem, it is revealed that the difference ($D_W-D_T$) should be restricted within a certain range (0.4<($D_W-D_T$)/f<1.2). Although such kind of limit can improve aberrations, astigmatism and distortion of the image in some degrees, basically the problem is not actually resolved. In view of designing, the present invention provides a method that makes the distance difference approach the minimum so as to get high speed focusing and good aberration correction either in the WIDE position or in the TELE position.

SUMMARY OF THE INVENTION

Therefore it is a primary object of the present invention to provide a compact zoom lens with three lens groups and a design method thereof. Along the optical axis from the object side to the image side, the compact zoom lens includes a negative power first lens group having a negative power first biconcave lens with its convex surface facing the object side and a positive power second meniscus lens with its convex surface facing the object side; a positive power second lens group having a biconvex cylindrical third lens, a biconcave fourth lens and a fifth meniscus lens with its concave surface facing the object side; and a positive power third lens group having a positive power sixth lens. Each of the lens of the first lens group, the second lens group, and the third lens group has at least one aspherical surface. The focal length in the WIDE position, the TELE position, the focal length of the first lens group, the second lens group, and the third lens group are in a certain ratio to one another. Furthermore, make change of distance between $D_W$ (from the object plane of the first lens L1 to the image plane thereof in the WIDE position) and $D_T$ (from the object plane of the first lens L1 to the image plane thereof in the TELE position) as minimum as possible. Use minimum $|D_W-D_T|$ as the objective function of optimization to design a zoom lens with nearly unchanged lens length, wide viewing angle, high resolution, better image data and good aberration correction.

It is another object of the present invention to provide a compact zoom lens with three lens groups and a design method thereof in which a lens surface of the third lens of the second lens group and a lens surface of the fourth lens of the second lens group connect with each other to form a coupled lens. Moreover, by using a biconcave fourth lens and a fifth meniscus lens with its concave surface facing the object side, thickness of the second lens group is reduced and the zoom lens has higher telecentricity.

It is a further object of the present invention to provide a compact zoom lens with three lens groups and a design method thereof. While changing from the WIDE position to the TELE position, the second lens group moves closely to the first lens group so that the distance between the first lens group and the second lens group is reduced. The third lens group moves toward the image forming plane so that the distance between the second lens group and the third lens group is increased while the distance between the third lens group and the image forming plane is reduced. Thus zooming is achieved.

DETAILED DESCRIPTION OF THE PREFERRED EMBODIMENT

Figure 1:
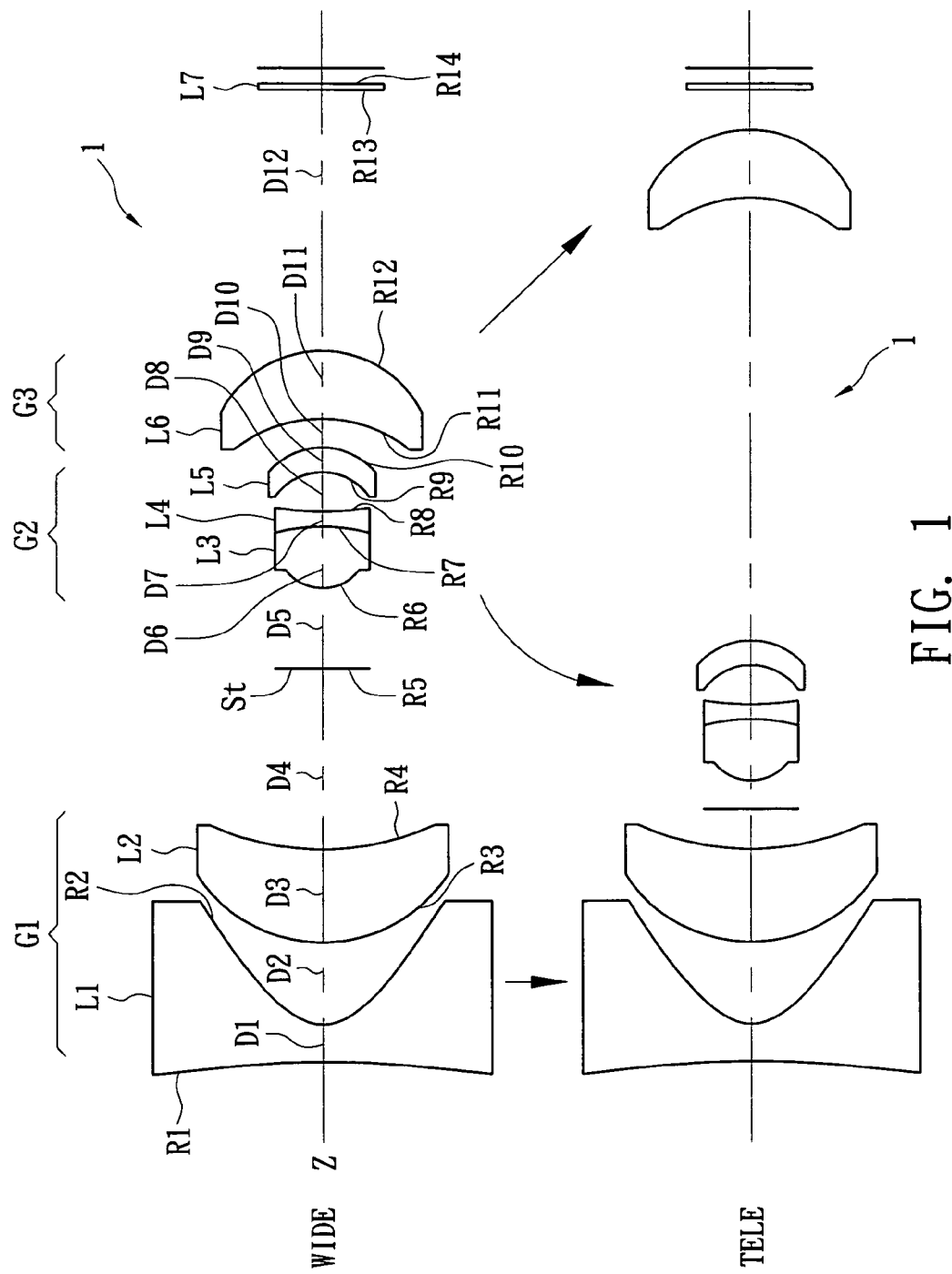
FIG. 1 is a schematic drawing showing how an embodiment of the present invention changes from a WIDE position to a TELE position.
Figure 2A:
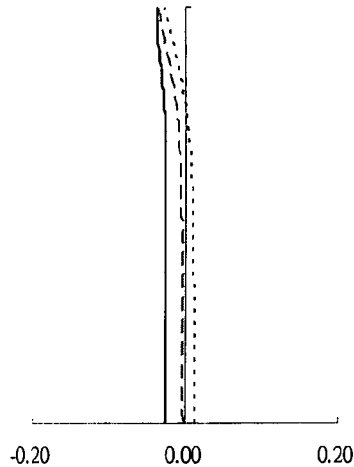
FIGS. 2A-2D are various aberrations of a first embodiment in the WIDE position according to the present invention.
Figure 2B:
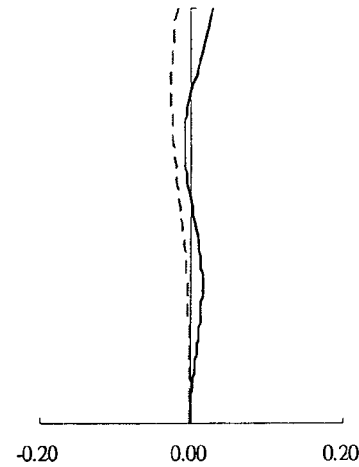
Figure 2C:
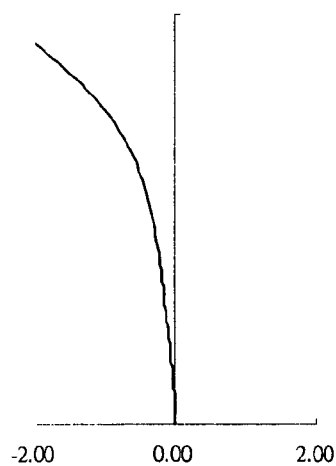
Figure 2D:
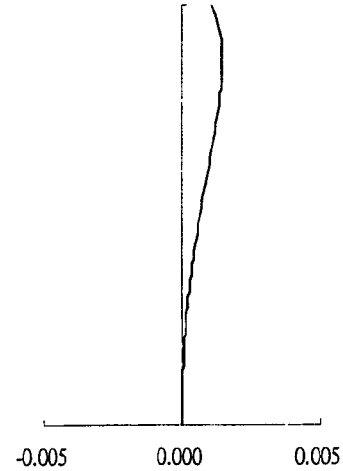
Figure 3A:
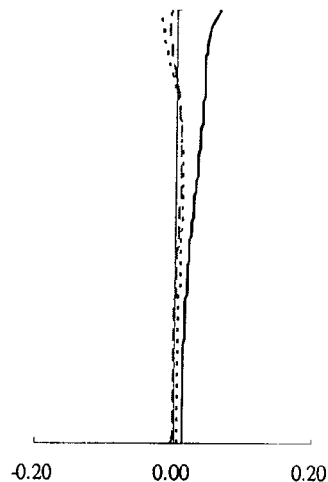
FIGS. 3A-3D are various aberrations of a first embodiment in the MID position according to the present invention.
Figure 3B:
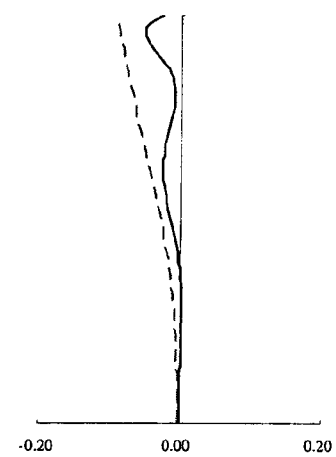
Figure 3C:
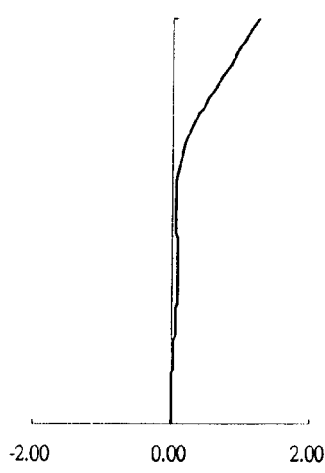
Figure 3D:
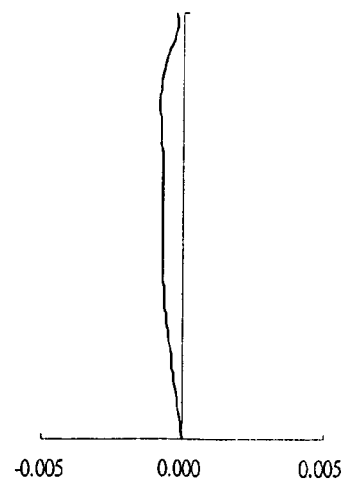
Figure 4A:
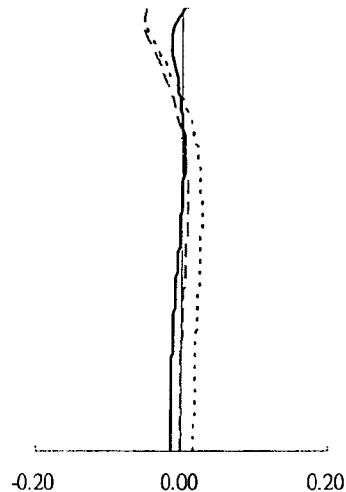
FIGS. 4A-4D are various aberrations of a first embodiment in the TELE position according to the present invention.
Figure 4B:
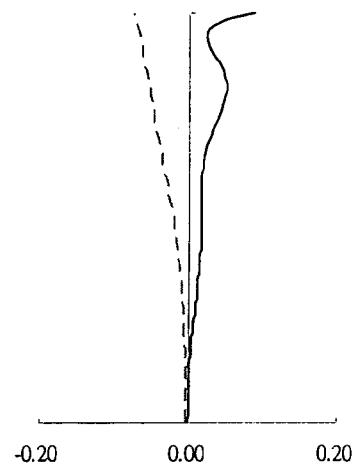
Figure 4C:
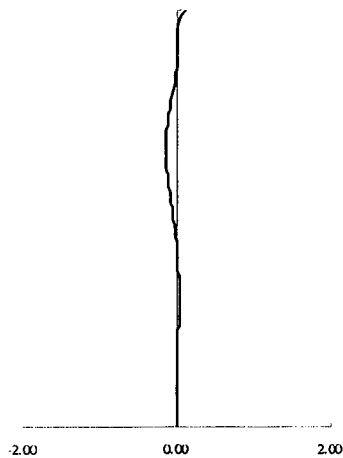
Figure 4D:
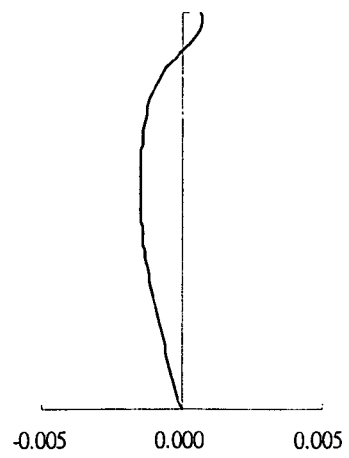
Figure 5A:
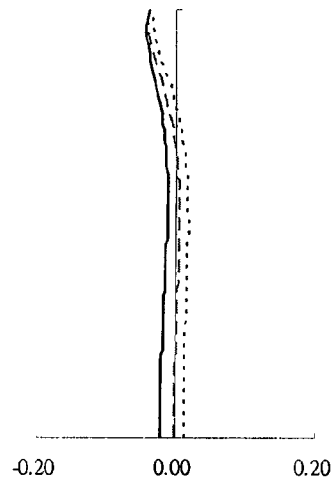
FIGS. 5A-5D are various aberrations of a second embodiment in the WIDE position according to the present invention.
Figure 5B:
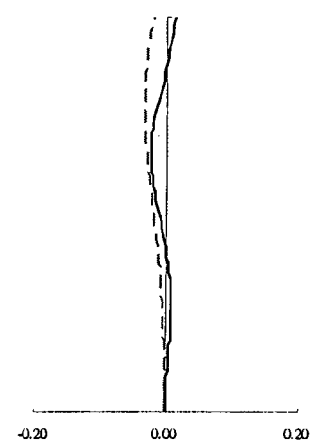
Figure 5C:
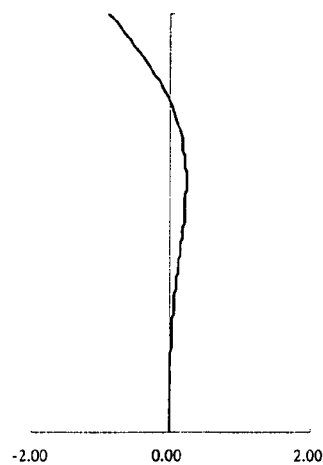
Figure 5D:
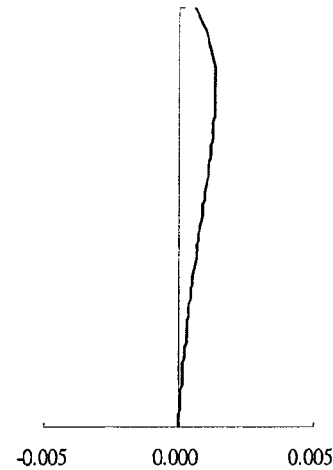
Figure 6A:
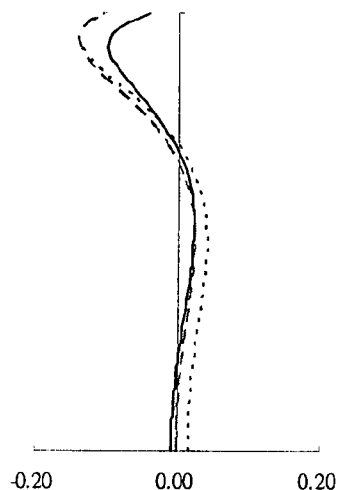
FIGS. 6A-6D are various aberrations of a second embodiment in the MID position according to the present invention.
Figure 6B:
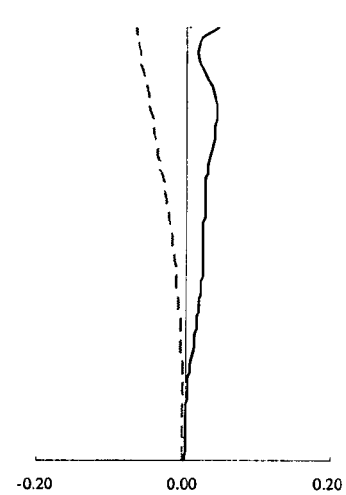
Figure 6C:
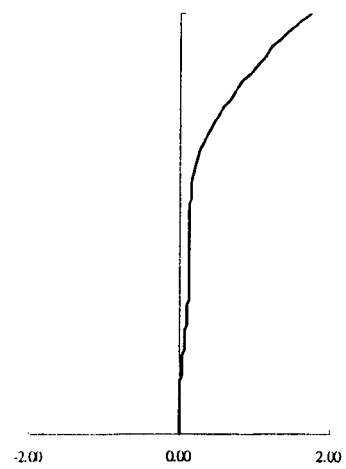
Figure 6D:
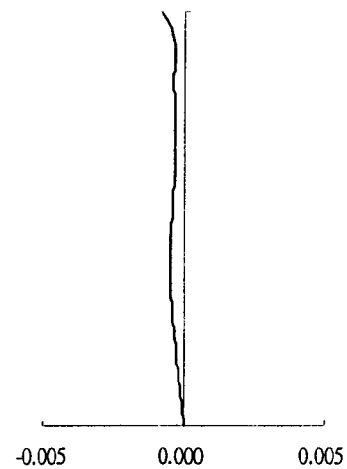
Figure 7A:
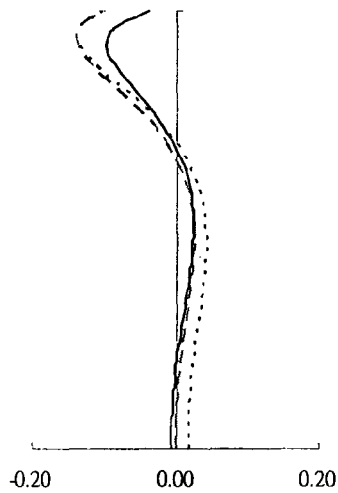
FIGS. 7A-7D are various aberrations of a second embodiment in the TELE position according to the present invention.
Figure 7B:
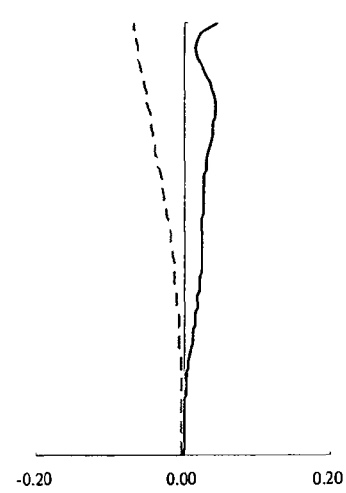
Figure 7C:
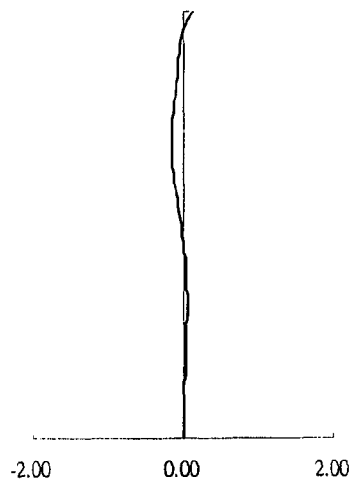
Figure 7D:
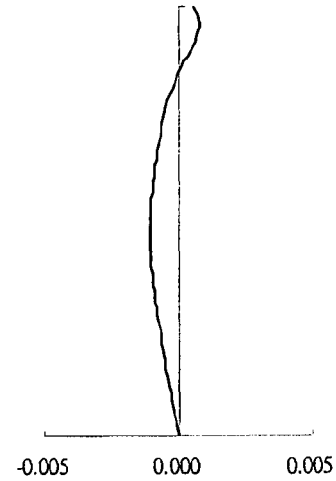

Refer to FIG. 1, each arrow respectively represents movement of the first lens group G1, the second lens group G2, and the third lens group G3 while changing from WIDE position to TELE position. The focus changes according to changes of the distances between each lens groups G1, G2, G3. Moreover, there is an image capture device such as CCD on the image side, not shown in figure. A filter L7 is disposed between the image side and the third lens group G3. A compact zoom lens with three lens groups 1 of the present invention is particularly suitable to be applied to compact digital cameras or video equipments.

A compact zoom lens with three lens groups 1 according to the present invention, including, along an optical axis (Z axis) from the object plane to the image forming plane: a first lens group G1 with a negative power, an aperture stop St that adjusts light traversing the device, a second lens group G2 with a positive power, a third lens group G3 with a positive power and an infrared cut filter L7. The first lens group G1 consists of a negative power first biconcave lens L1 with its convex surface facing the object side and a positive power second meniscus lens L2 with its convex surface facing the object side. The second lens group G2 includes a biconvex cylindrical third lens L3, a biconcave fourth lens L4 and a fifth meniscus lens L5 with its concave surface facing the object side while an image side lens surface of the third lens L3 connects with an object side lens surface of the fourth lens L4. They may be cemented and integrated into one lens to form a cemented lens or only lean against each other firmly without being cemented. The third lens group G3 is composed of a positive power sixth lens L6. The aperture stop ST is located between the first lens group G1 and the second lens group G2 for adjusting light traversing the device.

As magnification changes (change of focus) of the compact zoom lens with three lens groups 1 according to the present invention from the WIDE position to the TELE position, the second lens group G2 moves closer to the first lens group G1, as indicated by the arrow under the second lens group G2 while the third lens group G3 moves toward the image forming plane, as indicated by the arrow under the third lens group G3. Thus distance between the second lens group G2 and the third lens group G3 increases dramatically.

Furthermore, each lens of the first lens group G1, the second lens group G2 and the third lens group G3 include at least one aspherical optical surface. In the next embodiments—the first embodiment and the second embodiment, the first lens group G1 and the second lens group G2 respectively includes two and three aspherical optical surfaces while both optical surfaces of the sixth lens L6 of the third lens group G3 are aspherical optical surfaces. The aspherical optical surface is defined as the following function:

$$z = \left(\frac{Y^2}{R}\right) \bigg/ \left(1 + \left(1 - K \cdot \frac{Y^2}{R^2}\right)^{\frac{1}{2}}\right) + \sum (A_i \cdot Y^i) \quad \text{equation (1)}$$

wherein Z is distance from the intersection point of the plane tangent of the aspherical surface and the aspherical surface to the intersection point of the plane tangent of the aspherical surface and the optical axis and the unit is mm; Y is distance along the optical axis from the intersection point of the plane tangent of the aspherical surface and the optical axis to the aspherical surface and the unit is mm; R is curvature radius of the lens on the optical axis and the unit is mm; K is Conic coefficient; Ai is the ith aspherical coefficient. While in the WIDE position, the compact zoom lens with three lens groups 1 of the present invention correct aberrations, especially the coma aberration so as to match the equation (2):

$$2.5 < \left|\frac{f_{G1}}{f_W}\right| < 3.0 \quad \text{equation (2)}$$

In order to control magnification ratio as well as correct aberrations at the same time, match the equation (3):

$$1.1 < \left|\frac{f_{G1}}{f_{G2}}\right| < 1.7 \quad \text{equation (3)}$$

In order to control distortion, aberration and incident viewing angle, match the equation (4):

$$1.0 < \frac{f_{G3}}{f_T} < 1.3 \quad \text{equation (4)}$$

For easy correction of dispersion, match the equation (5):

$$0.08 < \left|\frac{f_3}{v_3} + \frac{f_4}{v_4}\right| < 0.28 \quad \text{equation (5)}$$

wherein $f_W$, $f_T$ respectively represent focal length of the zoom lens in the WIDE position and the TELE position;

$f_{G1}$, $f_{G2}$, and $f_{G3}$ respectively represents focal length of the first lens group G1, the second lens group G2, and the third lens group G3;

$f_3$, $f_4$ are focal length of the third lens and the fourth lens while $v_3$, $v_4$ are Abbe number of the third lens and the fourth lens.

When design the device, minimum change of distance between $D_W$ and $D_T$ ($|D_W - D_T|$) is as one of main design conditions. $D_W$ is distance from an object side surface of the first lens L1 to the image forming plane in the WIDE position while $D_T$ is distance from the object side surface of the first lens L1 to the image forming plane in the TELE position. That means use minimum $|D_W - D_T|$ as the objective function of optimization. Then perform further designs that optimize optical effects of the compact zoom lens with three lens groups 1. Thus the compact zoom lens with three lens groups 1 matches the equation (6).

$$\min|D_W - D_T| \quad \text{equation (6)}$$

wherein $D_W$ is distance from the object side surface of the first lens L1 to the image forming plane in the WIDE position along the optical axis and $D_T$ is distance from the object side surface of the first lens L1 to the image forming plane in the TELE position along the optical axis.

A design method of a compact zoom lens with three lens groups of the present invention includes following steps:

Step S1: firstly, determine structure of the compact zoom lens with three lens groups 1. Along the optical axis from the object plane (object side) to the image forming plane (image side), the compact zoom lens 1 includes a negative power first lens group G1 having a negative power first biconcave lens L1 with its convex surface facing the object side and a positive power second meniscus lens L2 with its convex surface facing the object side; a positive power second lens group G2 having a biconvex cylindrical third lens L3, a biconcave fourth lens L4 and a fifth meniscus lens L5 with its concave surface facing the object side; and a positive power third lens group G3 having a positive power sixth lens L6. While changing focus from the WIDE position to the TELE position, the second lens group G2 moves closely to the first lens group G1 so that the distance $D_4$ between the second lens group G2 and the first lens group G1 is reduced. Moreover, the third lens group G3 moves toward the image forming plane so that the distance $D_{10}$ between the second lens group G2 and the third lens group G3 is increased while the distance $D_{12}$ between the third lens group G3 and the image forming plane is reduced.
Step S2: set values of $v_3$ and $v_4$ according to the above equation (2), equation (3), equation (4), and equation (5).
Step S3: calculate relationship between $D_W$ and $D_T$ and relationship between $f_3$ and $f_4$.
Step S4: determine objective function equation (6) and set reasonable values of f3 and f4 that make the objective function become minimum.
Step S5: according to the values of $v_3$ and $v_4$ in the step S2 and the values of f3 and f4 in the step S4, optical surfaces and distances of each lens are designed.
Step S6: check whether optical properties of the lens composed in step S5 match requirements of resolution and aberration corrections.
Step S7: once it matches, the design is finished. If not, turn back to the step S2.

The compact zoom lens with three lens groups designed by the above method is with about 3× zoom ratio and minimum change of the distance $(D_W-D_T)$. Moreover, the zoom lens has features of high resolution, high image quality and good aberration correction.

Refer to the following embodiment 1 and embodiment 2, the list 1 and the list 3 respectively show optical properties of the lens in each embodiment, Fno is f-number in the WIDE position, the MID position and the TELE position,
2ω is field view angle in the WIDE position, the MID position and the TELE position;
*on the right side of the No. represents the optical surface is an aspherical optical surface and is defined by the equation (1).

The list 2 and list 4 respectively show conic constant K, and the $4^{th}$, $6^{th}$, $8^{th}$, $10^{th}$, $12^{th}$, $14^{th}$ order aspherical coefficients $A_i$, wherein E represents the power of ten.

The First Embodiment

List 1
f, focal length 3.57(wide)~7.11(mid)~10.63(tele)
Fno 2.71(wide)~4.31(mid)~5.50(tele)
2ω 78.5(wide)~43.0(mid)~30.0(wide)

| No. | R, Radius of Curvature | D, Thickness | Nd, Refractive index | vd, Abbe number |
|---|---|---|---|---|
| 1* | −48.3360 | 0.67 | 1.5450 | 56.0 |
| 2* | 2.8262 | 1.54 | | |
| 3 | 5.8622 | 2.44 | 1.8467 | 23.8 |
| 4 | 12.7599 | Variable | | |
| 5 | STOP | 0.00 | | |
| 6* | 2.7058 | 1.53 | 1.5831 | 59.4 |
| 7 | −6.0136 | 0.42 | 1.8467 | 23.8 |
| 8 | 23.6867 | 0.65 | | |
| 9* | −2.1014 | 0.54 | 1.5450 | 56.0 |
| 10* | −2.3245 | Variable | | |
| 11* | −12.5903 | 1.62 | 1.5850 | 31.0 |
| 12* | −4.8942 | Variable | | |
| 13 | ∞ | 0.30 | 1.5168 | 64.2 |
| 14 | ∞ | 0.44 | | |

| | f, focal length | D4 | D10 | D12 |
|---|---|---|---|---|
| wide | 3.57 | 7.01 | 0.50 | 4.35 |
| mid | 7.11 | 2.94 | 7.50 | 1.42 |
| tele | 10.63 | 0.52 | 10.86 | 0.49 |

Total length of the whole zoom lens of this embodiment is 22 mm. (ΣD=22 mm)

List 2

| | | Aspherical coefficient | | | | | |
|---|---|---|---|---|---|---|---|
| No. | K | A4 | A6 | A8 | A10 | A12 | A14 |
| 1 | 0 | 1.512830E−04 | −1.452771E−05 | 4.707560E−07 | −6.423890E−09 | | |
| 2 | −1.03378 | 1.418426E−03 | −4.369113E−05 | 2.595131E−06 | −1.047563E−07 | | |
| 6 | 0 | 1.369791E−03 | 3.909841E−04 | 5.901597E−05 | 3.993601E−05 | | |
| 9 | 0 | −3.687056E−03 | 6.485657E−03 | 4.597677E−03 | −1.370744E−03 | 2.657432E−05 | |
| 10 | 0 | 9.430576E−03 | 5.753369E−03 | 2.598702E−03 | −3.895447E−04 | 6.891747E−06 | |
| 11 | 0 | −3.987438E−03 | −4.451959E−04 | 1.167147E−04 | −1.892990E−05 | 5.269934E−07 | 3.523572E−08 |
| 12 | 0.972084 | −2.692955E−04 | −3.780074E−04 | 7.902175E−05 | 6.783067E−08 | −1.215573E−06 | 8.102302E−08 | wherein No represent number of optical surfaces of each lens,
R is a radius of curvature,
D is thickness or distance (mm) of the lens along the optical axis,
ΣD is total length of the whole zoom lens,
Nd is refractive index,
vd is Abbe number, In this embodiment, $D_W-D_T=-0.05$ mm, or $|D_W-D_T|/\Sigma D=0.025$, change of the lens length is 2.5% of the lens length. Through such optimal design, the change of the distance $(D_W-D_T)$ between the object side surface of the first lens and the image forming plane while turning from the WIDE position to the TELE position is nearly zero (0).

The Second Embodiment

List 3
f, focal length 3.54(wide)~7.08(mid)~10.62(tele)
Fno 2.91(wide)~4.63(mid)~5.88(tele)
2ω 77.2(wide)~42.5(mid)~29.5(wide)

| No. | R, Radius of Curvature | D, Thickness | Nd, Refractive index | vd, Abbe number |
|---|---|---|---|---|
| 1* | −56.4669 | 0.80 | 1.5450 | 56.0 |
| 2* | 2.7880 | 1.55 | | |
| 3 | 5.6929 | 2.27 | 1.8467 | 23.8 |
| 4 | 12.0545 | Variable | | |
| 5 | STOP | 0.00 | | |
| 6* | 2.6973 | 1.52 | 1.5831 | 59.4 |
| 7 | −5.9021 | 0.41 | 1.8467 | 23.8 |
| 8 | 21.5621 | 0.64 | | |
| 9* | −2.1199 | 0.57 | 1.5450 | 56.0 |
| 10* | −2.3093 | Variable | | |
| 11* | −12.5497 | 1.67 | 1.5850 | 31.0 |
| 12* | −4.8342 | Variable | | |
| 13 | ∞ | 0.30 | 1.5168 | 64.2 |
| 14 | ∞ | 0.42 | | |

| | f, focal length | D4 | D10 | D12 |
|---|---|---|---|---|
| wide | 3.54 | 7.01 | 0.50 | 4.35 |
| mid | 7.08 | 2.94 | 7.50 | 1.42 |
| tele | 10.62 | 0.50 | 10.86 | 0.50 |

Total length of the whole zoom lens of this embodiment is 22 mm. (ΣD=22 mm)

List 4

| | | Aspherical coefficient | | | | | |
|---|---|---|---|---|---|---|---|
| No. | K | A4 | A6 | A8 | A10 | A12 | A14 |
| 1 | 0 | 1.855397E−04 | −1.484163E−05 | 4.590912E−07 | −6.134480E−09 | | |
| 2 | −1.03146 | 1.443482E−03 | −3.406259E−05 | 2.731971E−06 | −1.206310E−07 | | |
| 6 | 0 | 9.584780E−04 | 4.610859E−04 | 1.039275E−04 | 2.603570E−05 | | |
| 9 | 0 | −3.721617E−03 | 6.667228E−03 | 4.561676E−03 | −1.508240E−03 | 1.393316E−13 | |
| 10 | 0 | 9.508262E−03 | 5.703233E−03 | 2.567022E−03 | −3.983170E−04 | −3.260325E−20 | |
| 11 | 0 | −4.075432E−03 | −4.402059E−04 | 1.205204E−04 | −1.868060E−05 | 5.597187E−07 | 4.626585E−08 |
| 12 | 1.024445 | −1.590006E−04 | −3.540504E−04 | 7.948935E−05 | 2.092010E−07 | −1.186672E−06 | 8.473171E−08 |

In this embodiment, $D_W-D_T$=−0.005 mm, or $|D_W-D_T|/\Sigma D$=0.0025, change of the lens length is 0.25% of the lens length. Through such optimal design, the change of the distance ($D_W-D_T$) between the object side surface of the first lens and the image forming plane while turning from the WIDE position to the TELE position of the present invention is nearly zero (0).

It is found with reference from FIG. 2 to FIG. 7 that the zoom lens with nearly unchanged lens length, high resolution, high image quality and good aberration correction is produced under the condition that the change of the distance between the object side surface of the first lens and the image forming plane in the first embodiment and the second embodiment is nearly zero.

The device and the design method of the present invention have following advantages:

(1) While designing optical properties of the zoom lens, the process of optimizing optical properties will have effect on aberrations of the zoom lens. By minimum change of the distance ($D_W-D_T$) between the WIDE position and the TELE position, the problem of the lower quality of the zoom lens caused by the larger design tolerance from different distance between the object side of the first lens and the image forming plane is prevented. Due to restriction of minimum distance change ($D_W-D_T$), the design tolerance is reduced and the optical design is optimized so that better aberration is achieved.

(2) Due to inner focus, and the minimum distance change ($D_W-D_T$), users don't need to zoom in the front end of the lens when the device is not used. In usage, the lens is also not zoomed out so as to achieve design of shortest length of the lens. Moreover, frequency of the actuator to be used is reduced so that the difficulties in manufacturing and assembling of cameras are reduced and the cost is down.

(3) Due to limited total length of the whole zoom lens, the camera can cover the whole zoom lens so as to provide better protection and the product design of the camera is getting easier.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens with three lens groups, along an optical axis thereof, comprising in order from an object side to an image side, a negative power first lens group, a positive power second lens group and a positive power third lens group, wherein the first lens group comprising two lens, a negative power first biconcave lens with a first surface facing the object side and a positive power second meniscus lens with a first convex surface facing the object side along the optical axis from the object side to the image side;

the second lens group comprising three lens, a biconvex cylindrical third lens, a biconcave fourth lens and a fifth meniscus lens with its concave surface facing the object side while an image side lens surface of the third lens connects with an object side lens surface of the fourth lens;

the third lens group comprising a lens that is a positive power sixth lens;

wherein the first lens group, the second lens group, and the third lens group each has at least one aspherical surface;

while changing from a WIDE position to a TELE position of the zoom lens with three lens groups, the distance between the first lens group and the second lens group is reduced while the distance between the second lens group and the third lens group is increased and the distance between the third lens group and an imaging forming plane is reduced;

focal length of the first lens group, the second lens group, and the third lens group meets the conditions:

$$2.5 < \left|\frac{f_{G1}}{f_W}\right| < 3.0;$$

$$1.1 < \left|\frac{f_{G1}}{f_{G2}}\right| < 1.7;$$

$$1.0 < \frac{f_{G3}}{f_T} < 1.3;$$

and $$0.08 < \left|\frac{f_3}{v_3} + \frac{f_4}{v_4}\right| < 0.28$$

wherein $f_W$: focal length in the WIDE position;
$f_{G1}$: focal length of the first lens group;
$f_{G2}$: focal length of the second lens group;
$f_T$: focal length in the TELE position;
$f_{G3}$: focal length of the third lens group;
$f_3$: focal length of the third lens;
$f_4$: focal length of the fourth lens;
$v_3$: Abbe number of the third lens;
$v_4$: Abbe number of the fourth lens.

2. The zoom lens as claimed in claim 1, wherein the third lens and the fourth lens of the second lens group are cemented with each other to form a cemented lens while the third lens and the fourth lens respectively have at least one aspherical optical surface.

3. The zoom lens as claimed in claim 1, wherein the third lens and the fourth lens of the second lens group are leaned against each other while the third lens and the fourth lens respectively have at least one aspherical optical surface.

4. The zoom lens as claimed in claim 1, wherein an aperture stop is disposed between the first lens group and the second lens group.

5. The zoom lens as claimed in claim 1, wherein during zooming the first lens group is kept stationary and wherein the zoom lens with three lens groups further meet the condition:

$$|D_W - D_T / \Sigma D \leq 2.5\%;$$

wherein $D_W$ is distance from an object side surface of the first lens to the imaging forming plane in the WIDE position along the optical axis thereof, $D_T$ is distance from the object side surface of the first lens to the imaging forming plane in the TELE position along the optical axis thereof, and ΣD is total length of the compact zoom lens with three lens groups.

6. A design method of a zoom lens with three lens groups comprising the steps of:

S1: determining structure of a zoom lens with three lens groups, along an optical axis thereof comprising in order from an object side to an image side, a negative power first lens group having a negative power first biconcave lens with a first surface facing the object side and a positive power second meniscus lens with a first convex surface facing the object side; a positive power second lens group having a biconvex cylindrical third lens, a biconcave fourth lens and a fifth meniscus lens with its concave surface facing the object side; and a positive power third lens group having a positive power sixth lens; while changing from a WIDE position to a TELE position of the zoom lens with three lens groups, the second lens group moves closely to the first lens group so that the distance between the second lens group and the first lens group is reduced, and the third lens group moves toward an image forming plane so that the distance between the second lens group and the third lens group is increased but the distance between the third lens group and the image forming plane is reduced;

S2: setting values according to the following equations;

$$2.5 < \left|\frac{f_{G1}}{f_W}\right| < 3.0;$$

$$1.1 < \left|\frac{f_{G1}}{f_{G2}}\right| < 1.7;$$

$$1.0 < \frac{f_{G3}}{f_T} < 1.3;$$

and $$0.08 < \left|\frac{f_3}{v_3} + \frac{f_4}{v_4}\right| < 0.28;$$

wherein $f_W$: focal length in the WIDE position;
$f_{G1}$: focal length of the first lens group;
$f_{G2}$: focal length of the second lens group;
$f_T$: focal length in the TELE position;
$f_{G3}$: focal length of the third lens group;
$f_3$: focal length of the third lens;
$f_4$: focal length of the fourth lens;
$v_3$: Abbe number of the third lens;
$v_4$: Abbe number of the fourth lens;
S3: calculating relationship between $D_W$ and $D_T$ and relationship between $f_3$ and $f_4$;
S4: determining objective function: min $|D_W - D_T| \leq 0.05$ and set reasonable values of f3 and f4 that make the objective function become minimum;
S5: designing optical surfaces and distances of each lens according to the values of $v_3$ and $v_4$ in the step S2 and the values of f3 and f4 in the step S4;
S6: checking whether optical properties of the lenses formed in the step S5 match requirements of resolution and aberration corrections; and
S7: once it matches, finishing the design; if not, turning back to the step S2;
wherein $D_W$ is distance from an object side surface of the first lens to the imaging forming plane in the WIDE position along the optical axis thereof and $D_T$ is distance from the object side surface of the first lens to the imaging forming plane in the TELE position along the optical axis thereof.

7. The method as claimed in claim 6, wherein during zooming the first lens group is kept stationary and wherein the zoom lens with three lens groups further meet the condition:

$$|D_W - D_T / \Sigma D \leq 2.5;$$

wherein $D_W$ is distance from an object side surface of the first lens to the imaging forming plane in the WIDE position along the optical axis thereof, $D_T$ is distance from the object side surface of the first lens to the imaging forming plane in the TELE position along the optical axis thereof, and ΣD is total length of the compact zoom lens with three lens groups.

* * * * *